(12) United States Patent
Kawanami (10) Patent No.: US 7,787,759 B2
(45) Date of Patent: Aug. 31, 2010

(54) CAMERA WITH AUTOFOCUS SYSTEM

(75) Inventor: Naoto Kawanami, Tokyo (JP)

(73) Assignee: Hoya Corporation, Tokyo (JP)

( * ) Notice: Subject to any disclaimer, the term of this patent is extended or adjusted under 35 U.S.C. 154(b) by 796 days.

(21) Appl. No.: 11/534,683

(22) Filed: Sep. 25, 2006

(65) Prior Publication Data

US 2007/0071433 A1 Mar. 29, 2007

(30) Foreign Application Priority Data

Sep. 26, 2005 (JP) ............................ P2005-277433

(51) Int. Cl.
G03B 3/00 (2006.01)
G03B 13/24 (2006.01)
G03B 13/32 (2006.01)
H04N 5/232 (2006.01)
G02B 7/04 (2006.01)

(52) U.S. Cl. .................. 396/127; 396/80; 396/128; 396/150; 348/353; 250/201.7

(58) Field of Classification Search ................ 396/127, 396/79, 80, 82, 89, 93, 102, 103, 104, 121, 396/131, 150, 128; 348/345, 353–356, 365; 250/201.2, 201.4, 201.7
See application file for complete search history.

(56) References Cited

U.S. PATENT DOCUMENTS

| | | | | |
|---|---|---|---|---|
| 4,782,396 A | * | 11/1988 | Park .......................... | 348/353 |
| 5,815,748 A | * | 9/1998 | Hamamura et al. .......... | 396/104 |
| 2005/0280735 A1 | * | 12/2005 | Nakahara .................... | 348/345 |
| 2006/0078323 A1 | | 4/2006 | Nakahara | |
| 2007/0071434 A1 | | 3/2007 | Kawanami | |
| 2007/0140676 A1 | | 6/2007 | Nakahara | |

FOREIGN PATENT DOCUMENTS

| | | |
|---|---|---|
| JP | 2001-154083 | 6/2001 |
| JP | 2002-207160 | 7/2002 |
| JP | 2005-326680 | 11/2005 |
| JP | 2005-326681 | 11/2005 |

OTHER PUBLICATIONS

U.S. Appl. No. 11/534,685 to Kawanami, filed Sep. 25, 2006.
U.S. Appl. No. 11/609,518 to Nakahara, filed Dec. 12, 2006.
English language Abstract of JP 2001-154083.
English language Abstract of JP 2002-207160.
English language Abstract of JP 2005-326680.
English language Abstract of JP 2005-326681.

* cited by examiner

Primary Examiner—Rochelle-Ann J Blackman
(74) Attorney, Agent, or Firm—Greenblum & Bernstein P.L.C.

(57) ABSTRACT

A camera has a contrast detector that successively detects contrast data of an object image that is formed on a light-receiving surface of an image sensor, and a focus detector that successively calculates a difference value between currently detected contrast data and previously detected contrast data, and that detects a focused situation on the basis of the difference value and the detected contrast data. The camera further has a focus adjuster that drives a photographing optical system so as continuously to shift an image-formed surface from a given position along an optical axis. While the photographing optical system is driven, the focus detector determines whether the image-formed surface surpasses a focused-position corresponding to a position of the light-receiving surface, on the basis of a decreasing-amount of the difference value.

20 Claims, 5 Drawing Sheets

CAMERA WITH AUTOFOCUS SYSTEM

BACKGROUND OF THE INVENTION

1. Field of the Invention

The present invention relates to a camera with an autofocus system. In particular, it relates to a camera with an autofocus system using a contrast detection method.

2. Description of the Related Art

In a digital camera such as a compact type digital camera, an autofocus system utilizing a contrast detection method is incorporated in a camera as a servomechanism. In the contrast detection method, contrast data are successively detected on the basis of image-pixel signals read from an image sensor, and auto-focusing is performed. When peak or maximum contrast data is detected, in other words, when high spatial high frequency components in an object image becomes a highest value, it is determined that an object is in focus, and a focusing lens is driven to the focused point. The user can confirm the focused situation via an LCD monitor on a rear surface of the camera.

Usually, the focused position is detected by a gradient method (the so called "climbing method") in which a top point in a distributed curved line of high frequency components is searched. The contrast data is successively detected while continuously driving a focusing lens, and it is determined that an object is in focus when the contrast data has a peak value.

To confirm whether the contrast data is actually a peak contrast data, the focusing lens is driven so as to surpass the focused position, and a plurality of contrast data are further detected, causing it to be difficult to shorten the required time for focusing.

SUMMARY OF THE INVENTION

An object of the present invention is to provide a camera that is capable of focusing an object precisely and immediately.

A camera according to the present invention has a contrast detector, and a focus detector. The contrast detector successively detects contrast data of an object image that is formed on a light-receiving surface of an image sensor. The focus detector successively calculates a difference value between currently detected contrast data and previously detected contrast data, and detects a focused situation on the basis of the difference value and the detected contrast data. For example, the contrast detector detects contrast data on the basis of image-pixel signals that are successively read from the image sensor, a video-image displayer that displays a video-image on the basis of the image-pixel signals, is provided. Further, the camera has a focus adjuster.

In the present invention, the focus adjuster drives a photographing optical system so as to continuously shift an image-formed surface from a given position along an optical axis. While the photographing optical system is driven, the focus detector determines whether the image-formed surface surpasses a position (hereinafter, called a "focused-position") corresponding to a position on the light-receiving surface, on the basis of a decreasing-amount of the difference value. When the image-formed surface surpasses the focused-position, the focus adjuster drives the photographing optical system so as to position the image-formed surface on the focused-position. An image of a focused object is formed on the light-receiving surface, and a clear image is displayed on a monitor, or is recorded on a memory.

Preferably, the focus detector determines whether the detected contrast data is lower than the previously detected contrast data, and the difference value decreases by a given value more than a predetermined value. For example, the focus detector determines whether the difference value increases and becomes a value equal to or less than a positive value adjacent to zero. Preferably, the focus detector calculates maximum contrast data from a series of contrast data by approximation. The focus adjuster defines a position corresponding to the maximum contrast data as the focused position.

BRIEF DESCRIPTION OF THE DRAWINGS

The present invention will be better understood from the description of the preferred embodiment of the invention set forth below together with the accompanying drawings, in which.

DESCRIPTION OF THE PREFERRED EMBODIMENTS

Hereinafter, the preferred embodiment of the present invention is described with reference to the attached drawings.

Figure 1:
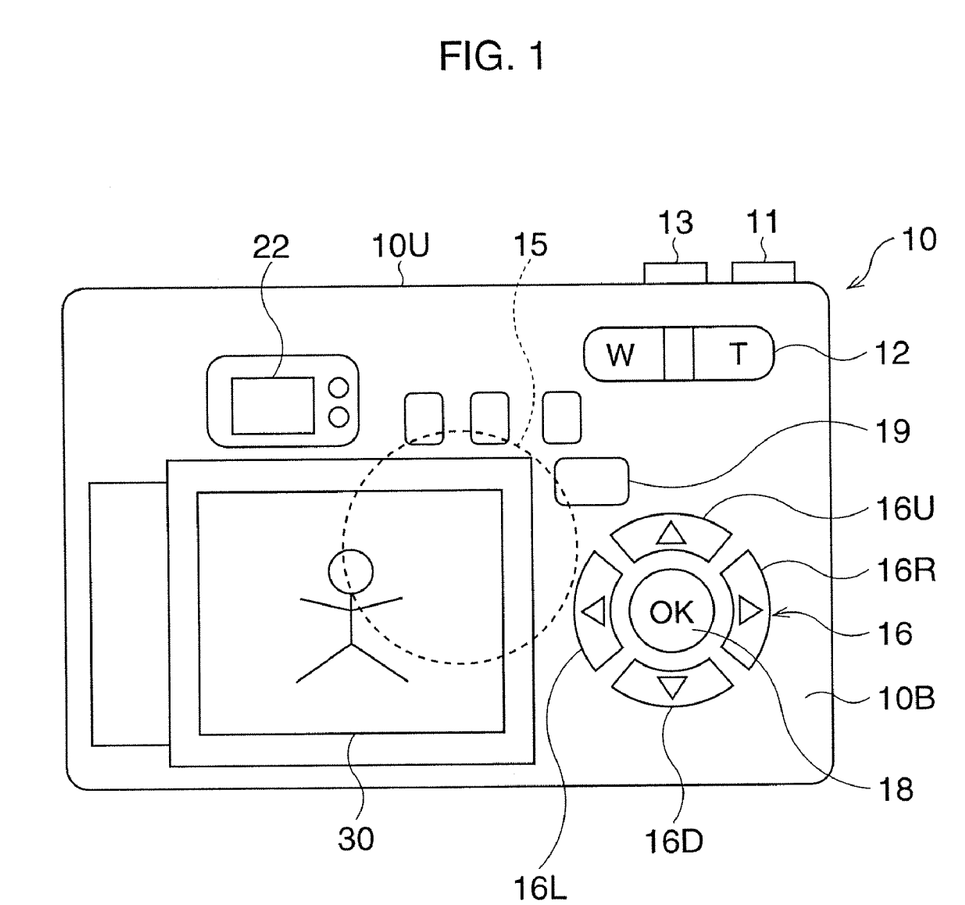
FIG. 1 is a rear view of a digital camera according to a present embodiment.

FIG. 1 is a rear view of a digital camera according to a present embodiment.

A digital camera 10 has an LCD monitor 30 on a back surface 10B, and a view finder 22 above the LCD monitor 30. Further, a series of buttons are provided on the back surface 10B. Herein, a zoom button 12; a cross-shaped button composed of an up-button 16U, a down-button 16D, a right-button 16R, and a left-button 16L; an OK button 18; and a mode button 19, are provided. The mode button 19 is operated to switch among a photographing-mode, a video-image recording mode, and a replay-mode.

A main-button 11 and a release button 13 are provided on an upper surface 10U. The camera 10 is turned ON by depressing the main-button 11, and an object image is recorded by operating the release button 13. In a lens barrel (not shown) provided on a front surface of the camera 10, a photographing optical system 15 is installed.

Figure 2:
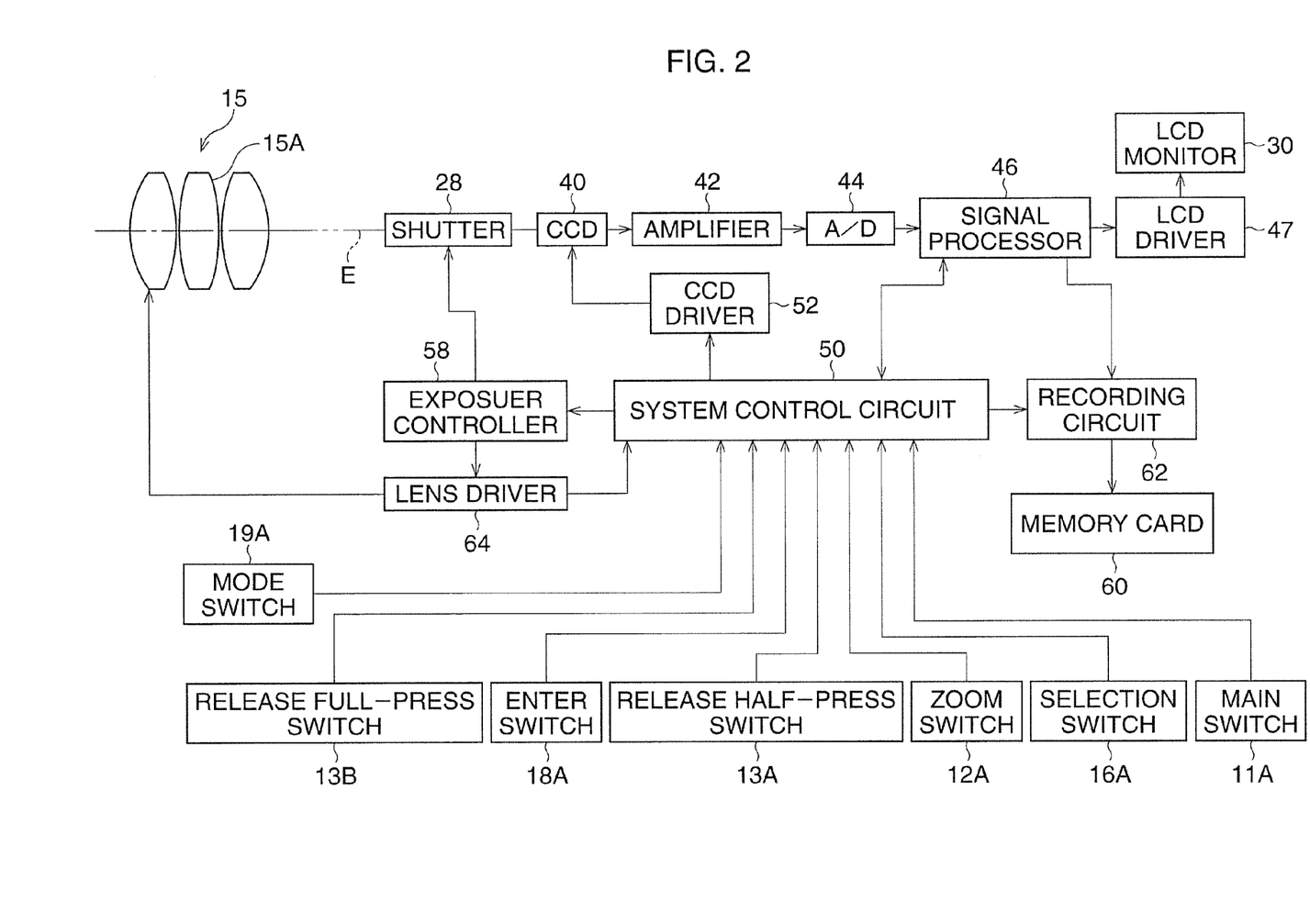
FIG. 2 is a block diagram of the digital camera.

FIG. 2 is a block diagram of the digital camera 10 according to the present embodiment.

A system control circuit 50 including a CPU, a ROM, and a RAM controls the operation of the camera 10, and a main switch 11A, a zoom switch 12A, a release half-press switch 13A, a release full-press switch 13B, a selection switch 16A, an enter switch 18A, and a mode switch 19A are connected to the system control circuit 50. In the ROM, a program for controlling the operation of the camera 10 is stored.

When the photographing mode is selected, a signal process for displaying a movie-image or video-image on the LCD monitor 30 is performed. An object image is formed on a light-receiving surface of a CCD 40 by light passing through the photographing optical system, and image-pixel signals corresponding to the object image are generated in the CCD 40. The CCD 40 is driven by a CCD driver 52 so that the image-pixel signals are successively read from the CCD 40 at constant intervals. Herein, the image-pixel signals are read from the CCD 40 at 1/30 or 1/60 second intervals. The image-pixel signals are amplified in an amplifier 42, and are converted from analog signals to digital signals in an A/D converter 44.

In a signal processor 46, various processes, such as a white balance and a gamma correcting process, are performed on the digital image signals. The processed image signals are temporarily stored in a frame memory (not shown), and are fed to an LCD driver 47. The LCD driver drives the LCD monitor 30 on the basis of the image signals, so that a video-image is displayed on the LCD monitor 30. Further, luminance signals are successively generated from the image signals in the signal processor 46, and are fed to the system control circuit 50. In the system control circuit 50, contrast data are successively generated from the luminance signals.

When the release button 13 is depressed halfway, the release half-press switch 13A is turned ON. Consequently, the auto-focusing is performed, and the brightness of an object is detected. A focusing lens 15A, which is included in the photographing optical system 15, is driven along an optical axis E such that an image-formed surface coincides with the light-receiving surface of the CCD 40. Herein, an auto-focusing using the contrast detection method is applied. The focusing lens 15A is driven by a lens driver 64, which includes a stepping motor (not shown). An exposure controller 58 controls the position of the focusing lens 15A on the basis of control signals from the system control circuit 50. The system control circuit 50 detects the position of the focusing lens 15A.

When the release button 13 is depressed fully, the release full-press switch 13B is turned ON, so that a shutter 28 opens for a given interval. The shutter 28 is controlled by the exposure controller 58. One frame-worth of image-pixel signals are read from the CCD 40, and are subjected to various processes in the amplifier 42, the A/D converter 44, and the signal processor 46. Then, the image data is compressed in a recording circuit 62, and the compressed image data is stored in a memory card 60.

When the playback mode is selected, the compressed data is read from the memory card 60, and is subjected to a decompression process. The decompressed image data is fed to the LCD driver 47, and the LCD driver 47 drives the LCD monitor 30 so that a recorded object image is displayed on the LCD monitor 30. When the video-image recording mode is selected, a series of image-pixel signals that are read from the CCD 40 for several seconds are subjected to image processes, and video-image data are compressed and recorded on the memory card 60.

Figure 3:
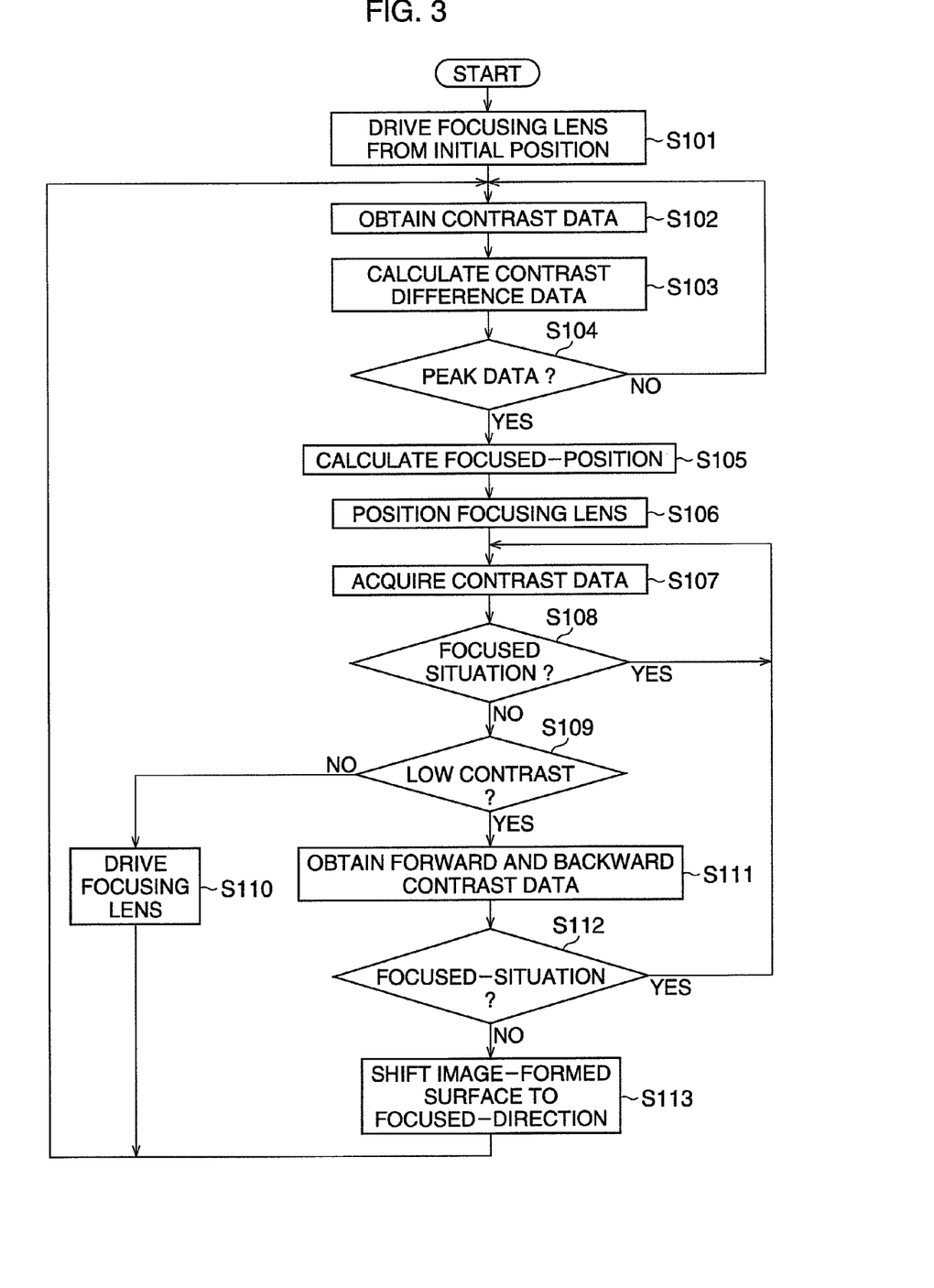
FIG. 3 is a flowchart of an auto-focusing process performed by the system control circuit.

FIG. 3 is a flowchart of an auto-focusing process performed by the system control circuit 50.

In Step S101, the focusing lens 15A is set to an initial position, and is driven such that the image-formed surface is continuously shifted along the optical axis E. The position of the image-formed surface along the optical axis varies with the distance from the camera to an object to be captured. The initial position of the focusing lens 15A focuses on an object that is close to the camera 10, and the focusing lens 15A is continuously driven such that the image-formed surface is shifted toward a direction in which an object at a distance from the camera or an object at infinity is focused. The position of the image-formed surface, in which an object image is clearly or sharply formed, is shifted by changing the focal length. The shift-amount of the image-formed surface along the optical axis E depends upon the rotation-amount of the stepping motor included in the lens driver 64.

In Step S102, the contrast data is obtained. The contrast data, which represents the high-frequency components in image data, is successively generated from one frame-worth of image-pixel signals at 1/30 or 1/60 second intervals. The contrast data is obtained by calculating a luminance difference, which is the difference between a maximum luminance level and a minimum luminance level in one frame worth of image signals. Note that, to perform a low-pass filter process, the contrast data is herein obtained by calculating the average of a currently obtained contrast data and a previously obtained contrast data.

In Step S103, contrast difference data is calculated. The contrast difference data represents a difference value between presently detected contrast data and previously detected contrast data stored in the RAM. Then, in Step S104, it is determined whether the previously detected contrast data is the peak or highest data in a series of detected contrast data.

Figure 4:
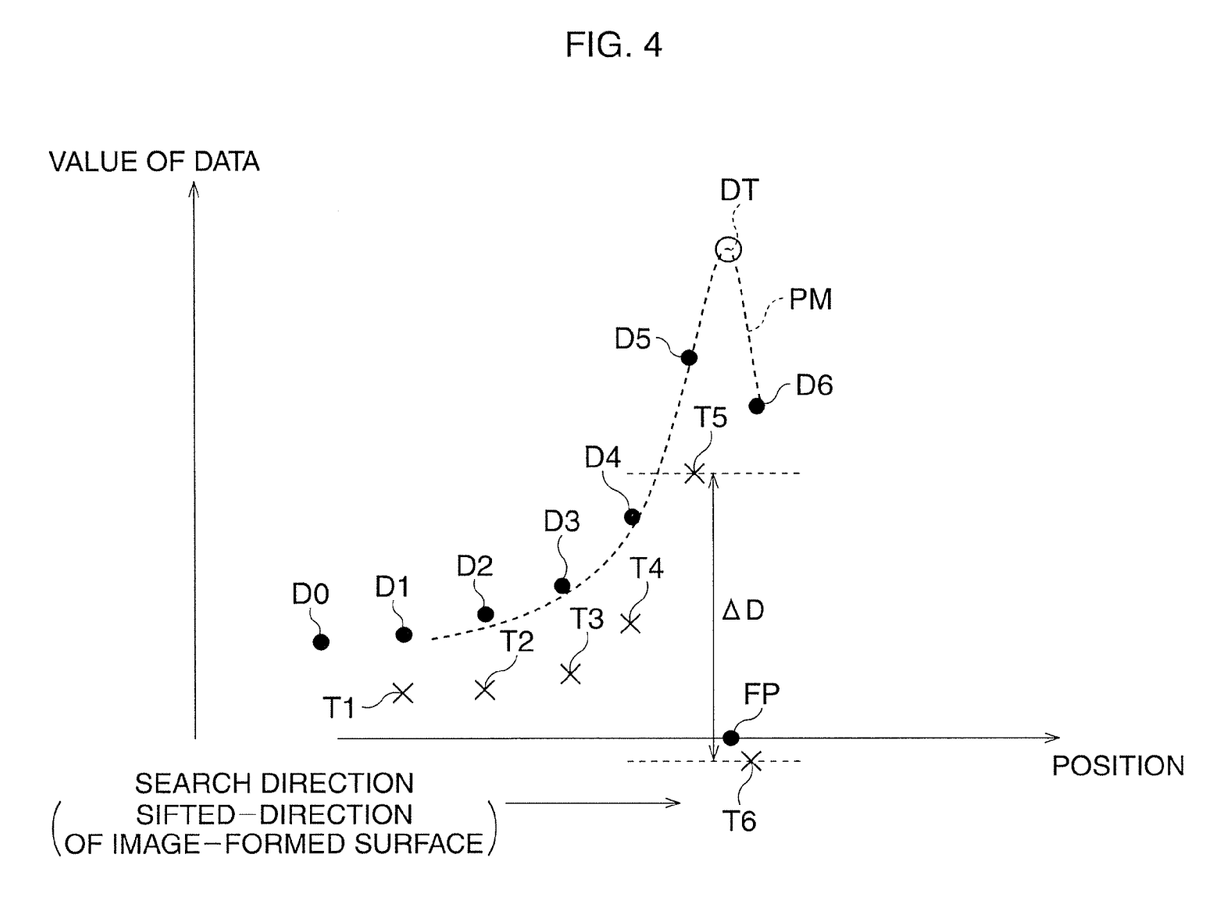
FIG. 4 is a view showing plots of the contrast data and the contrast difference data.

FIG. 4 is a view showing plots of the contrast data and the contrast difference data.

In FIG. 4, the contrast data "D0" to "D6" and the contrast difference data "T1" to "T6" are plotted along a direction that the image-formed surface shifts. The contrast data increases gradually as the image-formed surface is shifted. Then, the contrast data abruptly increases when the image-formed surface moves to a position adjacent to a focused position; in other words, to a position of the light receiving surface of the CCD 40. When the image-formed surface surpasses the focused position, the contrast data abruptly decreases. On the other hand, the contrast difference data increases gradually while the contrast data increases, and abruptly increases when the image-formed surface is adjacent to the focused position (the position of the light-receiving surface of the CCD 40). Then, the contrast difference data abruptly decreases when the image-formed surface surpasses the focused position. Generally, the contrast difference data becomes a value adjacent to zero or a negative value when the image-formed surface surpasses the focused-position (in FIG. 4, a negative value). In Step S104 shown in FIG. 3, it is determined whether the present or latest contrast data is lower than the previous or last contrast data, and whether the calculated contrast difference data decreases by an amount more than a given amount. Herein, it is determined whether a decreasing difference "ΔD" between the presently calculated contrast difference data and the previously calculated contrast difference data exceeds a predetermined standard difference "T0".

When it is determined that the present contrast data is not lower than the previous contrast data or that the difference "ΔD" does not exceed the standard difference "T0" (namely, when it is determined that the previous contrast data is not the peak or highest data), the process returns to Step S102. On the other hand, when it is determined that the previously contrast data is peak data, the process goes to Step S105. In FIG. 4, contrast data "D6" is lower than previously detected contrast data "D5". In this case, the difference "ΔD" between the presently calculated contrast difference data "T6" and the previously calculated contrast data "T5" exceeds the standard difference "T0". The standard difference "T0" is defined in accordance with the focal length of the photographing optical system 15.

In Step S105, an approximate quadratic curved line "PM" is calculated from a series of detected contrast data, and a maximum peak contrast data "DT", which is a maximum value in the curved line "PM", is obtained from the curved line "PM". Then, a position "FP" (hereinafter, called a "focused position") of the image-formed surface, which corresponds to the maximum contrast data "DT", is calculated. In Step S106, the focusing lens 15A is driven such that the image-formed surface returns to the focused position "FP", which coincides with the light-receiving surface of the CCD 40. Thus, a reliably focused image is displayed on the LCD monitor 30.

In Step S107, the contrast data is newly acquired. Then, in Step S108, it is determined whether an object is maintained to be in focus. Herein, it is determined whether the difference between the newly obtained contrast data and the previously detected contrast data is within a predetermined tolerance range. When the difference is within the tolerance range, it is determined that the newly obtained contrast data is substantially the same as the previously detected contrast data (namely, that the focused situation is maintained); then the process returns to Step S107. While the focused situation is maintained, Steps S107 to S108 are repeatedly performed. On the other hand, when it is determined that the difference exceeds the tolerance range (namely, that the object has become out of focus, the process goes to Step S109. The focused situation can be changed to a defocused situation due to an alternation or change of an object to be captured, a movement of the object, or the movement of the camera 10.

In Step S109, it is determined whether the detected contrast data has a relatively low value; namely, whether the object image is of low contrast, i.e., the range of the variation over the image is small. Herein, it is determined whether the maximum data in the series of detected contrast data is equal to or lower than a given value. When it is determined that the contrast data is not low-contrast data, the process goes to Step S110, wherein the focusing lens 15A is driven to the initial position. Then, Steps S102 to S106 are performed to focus an object. On the other hand, when it is determined that the contrast data is low-contrast data, the process goes to Step S111.

In Step S111, the focusing lens 15A is driven forward and backward such that the image-formed surface shifts toward a direction (hereinafter, called a "forward direction") in which an object close to the camera is focused, and further shifts toward a direction (hereinafter, called a "backward direction") in which an object far away from the camera is focused. The image-formed surface is shifted to a given position toward the forward direction, and is shifted to a given position toward the backward direction. The two positions (hereinafter, called a "forward position" and a "backward position", respectively) are both separated from the position determined in Step S106 by a common interval. While driving the focusing lens 15A, contrast data (hereinafter, called a "forward contrast data") is detected at the forward position, and contrast data (hereinafter, called a "backward contrast data) is detected at the backward position. In Step S112, based on the forward and backward contrast data and the contrast data obtained in Step S107 (hereinafter, called "standard contrast data"), it is determined whether the focused situation is substantially maintained in the low-contrast condition. The standard contrast data is detected at a position before shifting the image-formed surface.

Figure 5A:
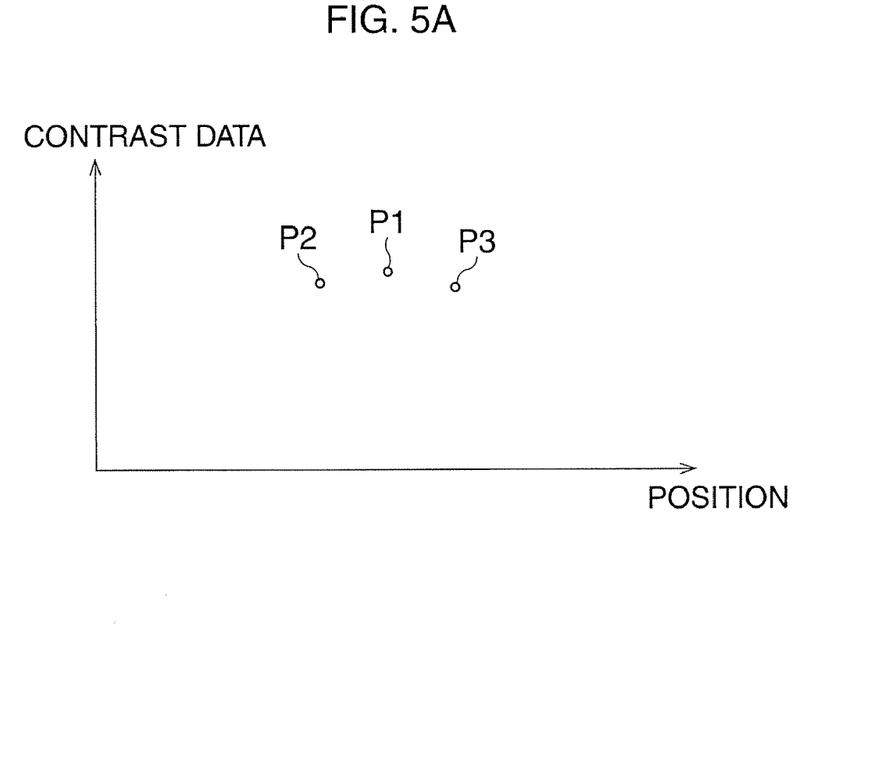
FIGS. 5A and 5B are views showing a view three neighboring contrast data.

FIG. 5A is a view showing three neighboring contrast data. The contrast data P1 represents the standard contrast data that is obtained before shifting the focusing lens 15A, and the contrast data P2 and P3 represent the forward contrast data and the backward contrast data, respectively. The forward and backward contrast data P2 and P3 are lower than the standard contrast data P1, and a difference between the standard contrast data P1 and the forward and backward contrast data P2 and P3 are small. In this case, the focused situation is substantially maintained. In Step S112, it is determined whether the forward and backward contrast data are lower than the standard contrast data, and whether the decreasing rates of the standard contrast data is equal to or lower than 2 percent. When it is determined that the focused situation is substantially maintained, the process returns to Step S107.

On the other hand, when it is determined that the focused situation is not maintained, the process goes to Step S113. In Step S113, the shifting-direction of the image-formed surface is determined on the basis of the standard contrast data and the forward and backward contrast data. The shifting-direction is a forward direction close to the photographing optical system 15 or a backward direction away from the photographing optical system 15, and the direction that the contrast data increases is determined as the shifting-direction. Then, the focusing lens 15A is driven in accordance with the determined shifting-direction.

Figure 5B:
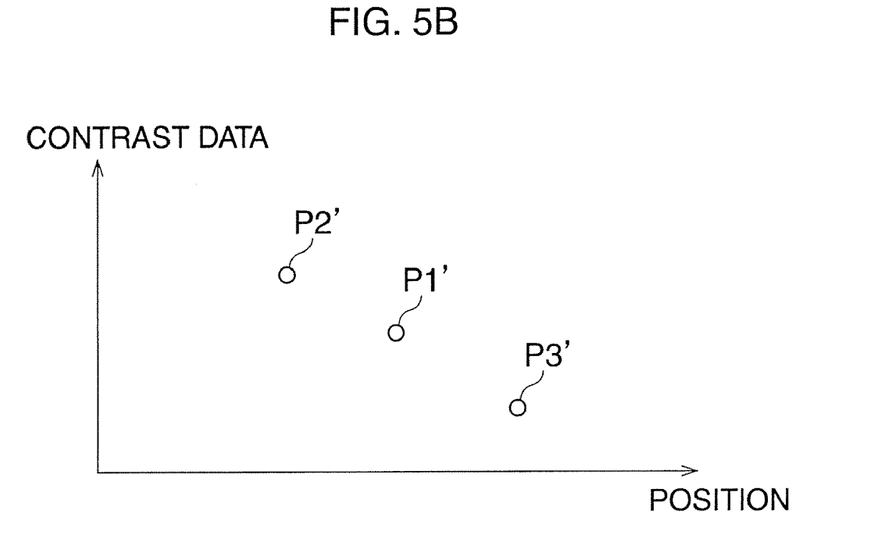

FIG. 5B is a view showing another three neighboring contrast data. The contrast data P1' represents the standard contrast data, and the contrast data P2' and P3' represent the forward contrast data and the backward contrast data, respectively. As shown in FIG. 5B, the forward contrast data P2' is higher than the standard contrast data P1', whereas the backward contrast data P3' is lower than the standard contrast data P1'. In this case, since the image-formed surface is at a backward position relative to the light-receiving surface of the CCD 40, the image-formed surface is shifted to the forward direction that is close to the photographing optical system 15. In Step S113, the focusing lens 15A is driven such that the image-formed surface coincides with the light-receiving surface of the CCD 40. After Step S113 is performed, the process returns to Step S102.

In this way, in the present embodiment, the focusing lens 15A is driven such that the image-formed surface of the object is continuously shifted from the initial position, and the contrast difference data are calculated. Then, it is determined whether the object becomes in focus on the basis of the decrease of the contrast data and the decreasing-amount of the contrast difference data. When it is determined that the object has become in focus, the focused position is calculated by the approximation, and the focusing lens 15A is driven such that the image-formed position is on the calculated focused position; namely, the position of the light-receiving surface of the CCD 40. Since the focused situation is detected by the latest contrast data that is obtained after the image-formed surface surpasses the focused position, the auto-focusing is rapidly performed.

In this way, in the present embodiment, the focusing lens 15 is driven such that the image-formed surface of the CCD 40 is continuously shifted from the initial position, and the contrast difference data are calculated. Then, it is determined whether the object becomes in focus on the basis of the decrease of the contrast data and the decreasing-amount of the contrast difference data. When it is determined that the object has become in focus, the focused position is calculated by the approximation, and the focusing lens 15A is driven such that the image-formed position is on the calculated focused position; namely, the position of the light-receiving surface of the CCD 40. Since the focused situation is detected by the latest contrast data that is obtained after the image-formed surface surpasses the focused position, the auto-focusing is rapidly performed.

Further, when the object image is of low contrast, the shifting-direction of the image-formed surface is determined by the three contrast data neighboring one another. Thus, the auto-focusing is rapidly performed, even when the object image is of low contrast.

When the object image is of low contrast, the focused situation may be determined after the contrast data continuously decrease. The contrast data may be detected by another data other than the luminance deference data.

Optionally, it may be determined by the decreasing-amount of the contrast difference data whether the image-formed surface surpasses the focused position. Optionally, the shifting-direction of the image-formed surface may be determined even when the object image is not low contrast. The image-formed surface may be firstly shifted to the backward position and then shifted to the forward position.

Finally, it will be understood by those skilled in the arts that the foregoing description is of preferred embodiments of the device, and that various changes and modifications may be made to the present invention without departing from the spirit and scope thereof.

The present disclosure relates to subject matter contained in Japanese Patent Application No. 2005-277433 (filed on Sep. 26, 2005), which is expressly incorporated herein by reference, in its entirety.

The invention claimed is:

1. A camera, comprising:
a contrast detector that successively detects contrast data of an object image that is formed on a light-receiving surface of an image sensor;
a focus detector that successively calculates a difference value between currently detected contrast data and previously detected contrast data, determines whether the detected contrast data is lower than the previously detected contrast data, and whether the difference value decreases by a given amount more than a predetermined value to determine when the difference value becomes a value equal to or less than a positive value adjacent to zero and that detects a focused situation on the basis of the calculated difference value and the detected contrast data; and
a focus adjuster that drives a photographing optical system so as to shift an image-formed surface from a given position along an optical axis, said focus detector determining whether the image-formed surface surpasses a focused-position corresponding to a position of the light-receiving surface on the basis of a decreasing amount of the difference value, said focus adjuster driving said photographing optical system so as to position the image-formed surface on the focused-position when the image-formed surface surpasses the focused-position.

2. The camera of claim 1,
wherein said contrast detector detects contrast data on the basis of image-pixel signals that are successively read from the image sensor.

3. The camera of claim 2, further comprising:
a video-image displayer that displays a video-image on the basis of the image-pixel signals.

4. The camera of claim 1,
wherein said focus detector calculates maximum contrast data from a series of contrast data by approximation, said focus adjuster defining a position corresponding to the maximum contrast data as the focused position.

5. The camera of claim 1,
wherein the predetermined value of the difference value decrease varies based upon a focal length of the photographing optical system.

6. Apparatus for detecting a focused situation, comprising:
a contrast detector that successively detects contrast data of an object image that is formed on a light-receiving surface of an image sensor;
a calculator that successively calculates a difference value between currently detected contrast data and previously detected contrast data; and
a focus detector that detects a focused situation on the basis of the difference value and the detected contrast data, determines whether the detected contrast data is lower than the previously detected contrast data, and whether the difference value decreases by a given amount more than a predetermined value to determine when the difference value becomes a value equal to or less than a positive value adjacent to zero, a photographing optical system being driven so as to shift the image-formed surface from a given position along an optical axis, said focus detector determining whether the image-formed surface surpasses a focused-position corresponding to a position of the light-receiving surface on the basis of a decreasing-amount of the difference value.

7. The apparatus for detecting of claim 6,
wherein said contrast detector detects contrast data on the basis of image-pixel signals that are successively read from the image sensor.

8. The apparatus for detecting of claim 6, further comprising:
a video-image displayer that displays a video-image on the basis of the image-pixel signals.

9. The apparatus for detecting of claim 6,
wherein said focus detector calculates maximum contrast data from a series of contrast data by approximation, and defines a position corresponding to the maximum contrast data as the focused position.

10. The apparatus for detecting of claim 6,
wherein the predetermined value of the difference value decrease varies based upon a focal length of the photographing optical system.

11. A tangible computer readable medium encoded with an executable computer program product, comprising:
a contrast detecting segment that, when executed, successively detects contrast data of an object image that is formed on a light-receiving surface of an image sensor;
a calculating segment that, when executed, successively calculates a difference value between a currently detected contrast data and a previously detected contrast data; and
a focus detecting segment that, when executed, detects a focused situation on the basis of the difference value and the detected contrast data, determines whether the detected contrast data is lower than the previously detected contrast data, and whether the calculated difference value decreases by a given amount more than a predetermined value to determine when the difference value becomes a value equal to or less than a positive value adjacent to zero, a photographing optical system being driven so as to shift the image-formed surface from a given position along an optical axis, said focus detecting segment determining whether the image-formed surface surpasses a focused-position corresponding to a position of the light-receiving surface on the basis of a decreasing-amount of the difference value.

12. The tangible computer readable medium of claim 11,
wherein the contrast detecting segment detects contrast data on the basis of image-pixel signals that are successively read from the image sensor.

13. The tangible computer readable medium of claim 11, further comprising:
a video-image display segment that displays a video-image on the basis of the image-pixel signals.

14. The tangible computer readable medium of claim 11, wherein said focus detecting segment calculates maximum contrast data from a series of contrast data by approximation, and defines a position corresponding to the maximum contrast data as the focused position.

15. The tangible computer readable medium of claim 11, wherein the predetermined value of the difference value decrease varies based upon a focal length of the photographing optical system.

16. A method for detecting a focused situation, comprising:

successively detecting contrast data of an object image that is formed on a light-receiving surface of an image sensor;

successively calculating a difference value between currently detected contrast data and previously detected contrast data, determining whether the detected contrast data is lower than the previously detected contrast data, and whether the calculated difference value decreases by a given value more than a predetermined value to determine when the difference value becomes a value equal to or less than a positive value adjacent to zero;

driving a photographing optical system so as to shift an image-formed surface of an image sensor from a given position along an optical axis; and determining whether the image-formed surface surpasses a focused-position corresponding to a position of the light-receiving surface on the basis of a decreasing-amount of the difference value and the detected contrast data.

17. The method for detecting of claim 16, wherein the detecting detects contrast data on the basis of image-pixel signals that are successively read from the image sensor.

18. The method for detecting of claim 16, further comprising:

displaying a video-image on the basis of the image-pixel signals.

19. The method for detecting of claim 16, wherein the successively detecting calculates maximum contrast data from a series of contrast data by approximation, and defines a position corresponding to the maximum contrast data as the focused position.

20. The method for detecting of claim 16, further comprising:

varying the predetermined value of the difference value decrease based upon a focal length of the photographing optical system.

* * * * *